United States Patent
Galeazzi et al.

(10) Patent No.: US 9,435,442 B2
(45) Date of Patent: Sep. 6, 2016

(54) TUBULAR DIAPHRAGM

(71) Applicant: AcornVac Incorporated, Chino, CA (US)

(72) Inventors: Carlos J. Galeazzi, Alta Loma, CA (US); Neil Cletus Levers, Rancho Cucamonga, CA (US); Thomas Kent Zinn, Chino Hills, CA (US)

(73) Assignee: ACORNVAC, INCORPORATED, Chino, CA (US)

(*) Notice: Subject to any disclaimer, the term of this patent is extended or adjusted under 35 U.S.C. 154(b) by 208 days.

(21) Appl. No.: 13/987,457

(22) Filed: Jul. 26, 2013

(65) Prior Publication Data
US 2015/0028244 A1    Jan. 29, 2015

(51) Int. Cl.
F16K 7/02 (2006.01)
E03F 1/00 (2006.01)

(52) U.S. Cl.
CPC . *F16K 7/02* (2013.01); *E03F 1/006* (2013.01)

(58) Field of Classification Search
CPC ........................................... F16K 7/07
USPC ................................. 251/4, 5, 6, 7
See application file for complete search history.

(56) References Cited

U.S. PATENT DOCUMENTS

| | | |
|---|---|---|
| 3,494,588 A | 2/1970 | Kisling |
| 3,984,080 A | 10/1976 | Varis et al. |
| 4,111,391 A * | 9/1978 | Pilolla ............... 251/5 |
| 4,135,550 A | 1/1979 | Andersson |
| 4,607,663 A | 8/1986 | Raftis et al. |
| 4,630,635 A | 12/1986 | Bernstein et al. |
| 4,824,072 A | 4/1989 | Zakai |
| 5,535,983 A | 7/1996 | Hohermuth |
| 6,394,411 B1 | 5/2002 | Hafner et al. |
| 6,575,425 B1 | 6/2003 | Betz |
| 6,585,005 B1 | 7/2003 | Raftis et al. |
| 7,140,590 B2 | 11/2006 | Bush |
| 7,255,322 B1 | 8/2007 | Tiwet et al. |
| 7,832,431 B2 | 11/2010 | Doig |
| 2008/0251143 A1 * | 10/2008 | van der Meijden et al. . 137/613 |
| 2010/0222747 A1 * | 9/2010 | Wenchell et al. ........ 604/167.03 |
| 2011/0061756 A1 | 3/2011 | Doig |

* cited by examiner

*Primary Examiner* — Kevin Murphy
*Assistant Examiner* — Daphne M Barry
(74) *Attorney, Agent, or Firm* — Honigman Miller Schwartz and Cohn LLP; Matthew H. Szalach; Jonathan P. O'Brien

(57) ABSTRACT

Embodiments include tubular diaphragm valves with a preformed mechanical closure point and optionally concave or convex convolution areas located near the flanges. These mechanical closure points and convolution areas give the embodiments an extended operational life, as compared to that of conventional cylindrical diaphragms.

10 Claims, 5 Drawing Sheets

TUBULAR DIAPHRAGM

BACKGROUND OF THE INVENTION

Field of the Invention

This disclosure relates to tubular diaphragms with means for regulation of flow of fluids, including liquids, gasses, and emulsions, through a passage, that incorporate the embodiments and concepts in this disclosure.

BRIEF SUMMARY OF THE INVENTION

Embodiments comprise tubular diaphragms with a premolded shape giving them an enhanced lifetime in use. Embodiments include tubular diaphragms in which the premolded shape comprises a mechanical closure point. Embodiments include tubular diaphragms in which the premolded shape comprises a convolution area on at least one side of the tubular diaphragm. Embodiments also include tubular diaphragms in which the premolded shape comprises at least one side of the tubular diaphragm having a concave or convex shape.

Embodiments include the method of manufacturing of a tubular diaphragm having an enhanced lifetime comprises the step of molding the tubular diaphragm to include a preformed concave or convex shape on at least one side of the tubular diaphragm. Embodiments include the method of molding the tubular diaphragm to include a preformed convolution on at least one side of the tubular diaphragm. Embodiments include the method of molding a preformed mechanical closure point which approximates a tubular diaphragm in the closed position.

Embodiments include a tubular diaphragm which comprises a tube manufactured of resilient elastomer with walls of approximately constant thickness throughout, an inlet flange and an outlet flange at the ends of the tube, and the tube having an upper and a lower side. There is a preformed mechanical closure point in which the inner surfaces of the upper and lower sides are separated by a gap of not greater than ⅓ of the diameter of the tube, the mechanical closure point located approximately at the middle of the length of the tubular diaphragm and dividing the diaphragm into an inlet and a outlet portion. There are preformed convolution areas on the upper and lower sides of at least one of the inlet and outlet portions, the convolution area located adjacent to a flange and extending in length from to about 25% of the length of a side and, in width to about 33% of the width of a side, the convolution areas having a concave or a convex form when viewed from the side of the tubular diaphragm.

Embodiments are used in the same manner as conventional diaphragms. In operation of both conventional and embodiments of this disclosure, the outlet portion is subjected to a vacuum. The inlet is subject to the pressure of fluid at or above atmospheric pressure. The diaphragm is enclosed in a chamber. The valve remains closed when there is atmospheric pressure inside the chamber. Reduction of pressure inside the chamber allows the diaphragm to open and assume an approximately cylindrical cross-section throughout the diaphragm, and allows the fluid at the inlet portion to flow through the diaphragm through the outlet section.

Conventional diaphragms are subject to fatigue failure, especially in the outlet portion of the diaphragm, because the valve is in the closed position for most of its life, and the outlet portion of the diaphragm is subject the greatest pressure differential with respect to the chamber.

Embodiments of the present disclosure are highly resistant to fatigue failure and enjoy a substantially longer operational life than do conventional cylindrical diaphragms. Without being held to this explanation, the longer life of these embodiments is due to the mechanical closure point which is molded to approximate a closed preformed position. In embodiments, the movement of the top and bottom sides necessary to effect closure is minimized, as compared to conventional cylindrical diaphragms. In addition, the optional convolution areas on the top and bottom sides, and the optional shaped sides contribute to extended life in embodiments. Such tubular diaphragms are subject to lower stresses than conventional cylindrical diaphragms.

The following embodiments and aspects thereof are described and illustrated in conjunction with embodiments which are meant to be exemplary and illustrative, not limiting in scope. In various embodiments, one or more of the above-described problems have been reduced or eliminated, while other embodiments are directed to other improvements.

In addition to the exemplary aspects and embodiments described above, further aspects and embodiments will become apparent by reference to the drawings and by study of the following descriptions.

BRIEF DESCRIPTION OF THE SEVERAL VIEWS OF THE DRAWING(S)

DETAILED DESCRIPTION OF THE INVENTION

In this disclosure the term "tubular diaphragm" means a preshaped elastomeric tube used in a valve. The valve is installed in a fluid transportation system. The term "fluid" means liquids, gasses, or emulsions. The term "waste" means an unwanted fluid, as, for example, from toilets, sinks, grease traps, etc. The term "rest position" means the tubular diaphragm not installed in a chamber and not subjected to a vacuum. Although the words "inlet" and "outlet" are used in the descriptions of the embodiments, these words are used simply to facilitate descriptions and not to limit the use of the embodiments. It is specifically contemplated that embodiments may be used with the "inlet" side on the lower pressure side and with the "outlet" side on the higher pressure side.

First Embodiment

Figure 1A:
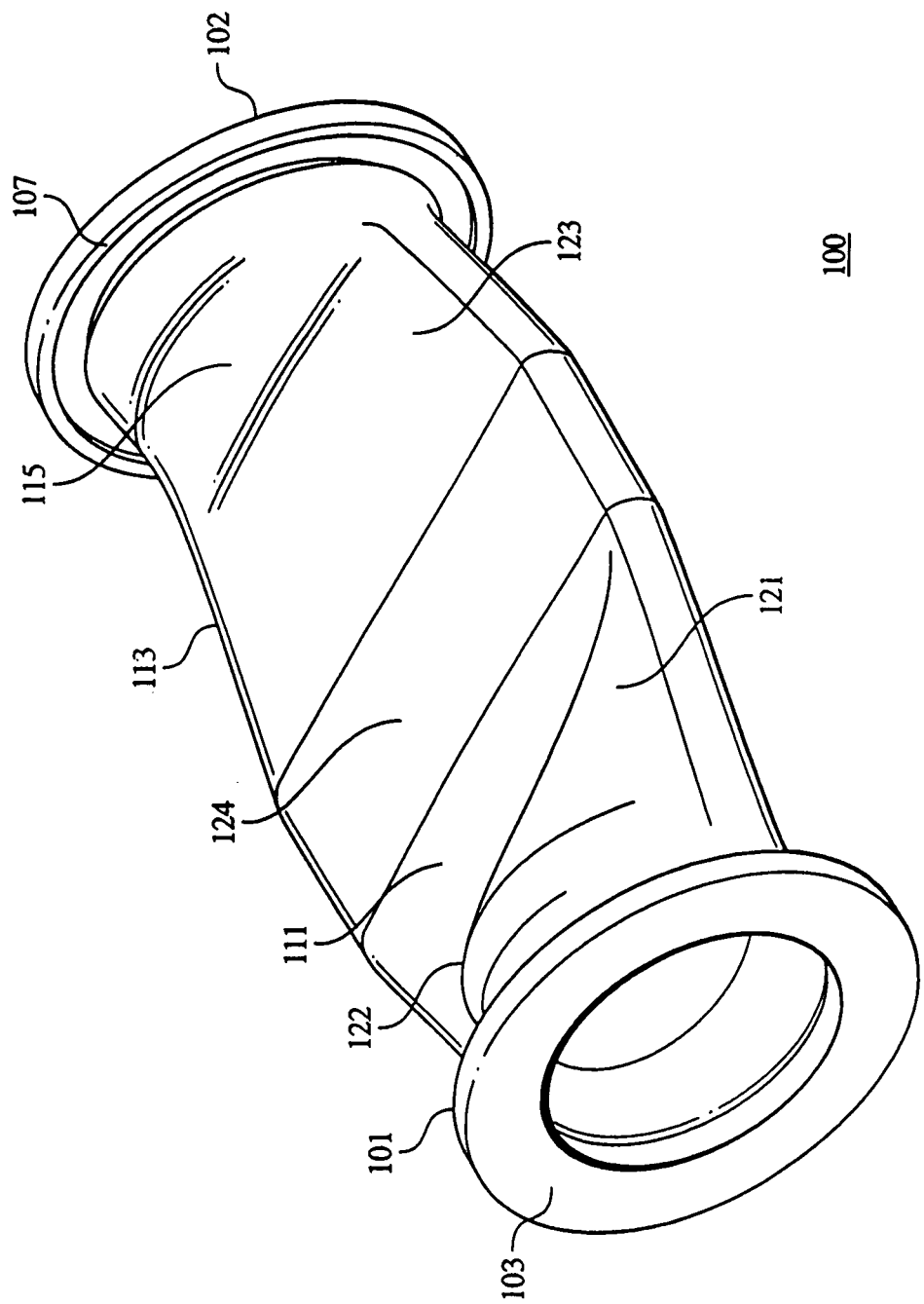
FIG. 1A is a perspective view of the first embodiment tubular diaphragm in the rest position.

FIG. 1A is a perspective view of the first embodiment tubular diaphragm 100 in the rest position. Visible in FIG.

1A is the inlet flange 103 located at a first end 101 of the tubular diaphragm, the upper side 115 of the tubular diaphragm, which is divided into the upper outlet side 113 and the upper inlet side 111 by the mechanical closure point 124 at approximately the middle of the upper side 115. The mechanical closure point 124 divides the entire tubular diaphragm into the inlet portion 121 and the outlet portion 123.

The mechanical closure point 124 is preformed during the manufacturing process such that the upper interior surface 131 (in FIG. 1D) and lower interior surface 131 (in FIG. 1D) are not touching but are separated by a distance not larger then ⅓ of the diameter of the tubular diaphragm.

Also visible in FIG. 1A is the inlet portion upper convolution area 122 and the outlet flange 107 located at the second end 102 of the tubular diaphragm. The convolution area extends approximately from the flange to about 25% of the length of the upper inlet side 111. The convolution area extends in width to about 33% of the width of the upper inlet side 111. A similar convolution area exists on the lower side of the tubular diaphragm and is shown in FIG. 1B.

Figure 1B:
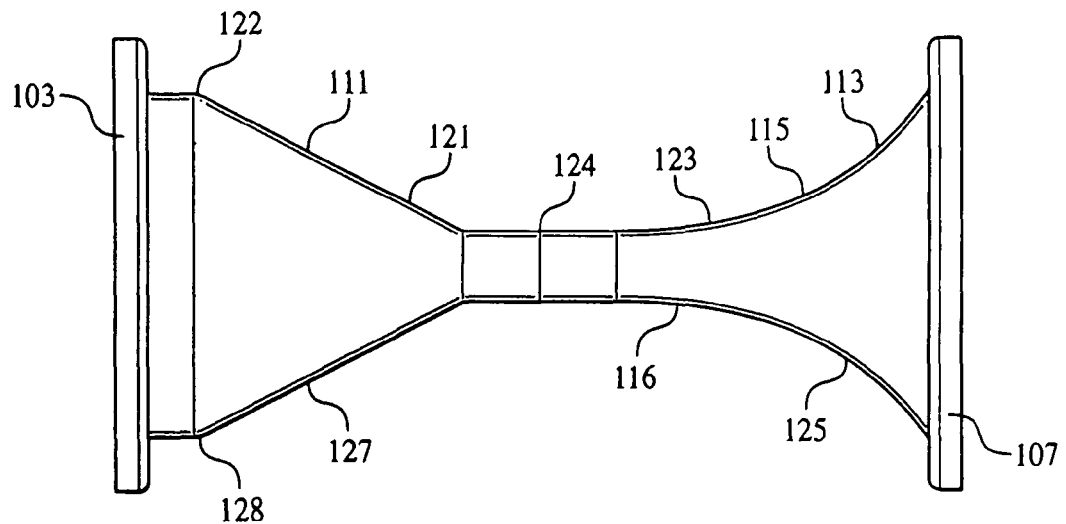
FIG. 1B is a side view of the first embodiment tubular diaphragm in the rest position.

FIG. 1B is a side view of the first embodiment tubular diaphragm in the rest position. Visible in FIG. 1B is the inlet flange 103, outlet flange 107, the upper side 115, and lower side 116, both of which are divided by the mechanical closure point 124 at approximately the middle of the upper and lower sides into the upper outlet side 113 and upper inlet side 111, and lower outlet side 125 and lower inlet side 127, respectively. The mechanical closure point 124 also divides the entire tubular diaphragm into the inlet portion 121 and outlet portion 123. Also visible in FIG. 1B is the inlet portion upper convolution area 122 and the inlet portion lower convolution area 128.

In the first embodiment as shown in FIG. 1B the inlet portion upper convolution area 122 extends from the inlet flange 103 at an approximate right angle and then curves downward to the upper inlet side 121 which extends in a straight line to the mechanical closure point 124. The inlet portion lower convolution area 128 extends from the inlet flange 103 at an approximate right angle and then curves upward to the lower inlet side 127 which extends in a straight line to the mechanical closure point 124.

The outlet portion upper outlet side 113 extends from the outlet flange 107 in a concave curve which is continued by the upper outlet side 113 to the mechanical closure point 124. The outlet portion lower outlet side 125 extends from the outlet flange 107 in a concave curve which is continued by the lower outlet side 125 to the mechanical closure point 124.

Figure 1C:
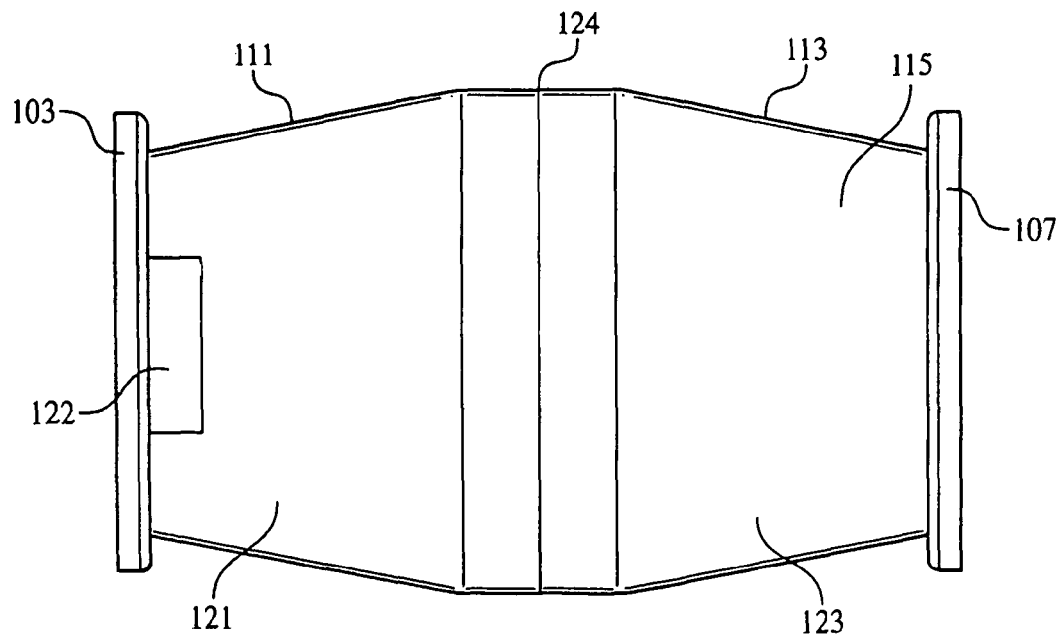
FIG. 1C is a upper view of the first embodiment tubular diaphragm in the rest position.

FIG. 1C is a upper view of the first embodiment tubular diaphragm in the rest position. Visible in FIG. 1C is the inlet flange 103, the upper side 115 of the tubular diaphragm, which is divided into the upper outlet side 113 and the upper inlet side 111 by the mechanical closure point at approximately the middle of the upper side 115. Also visible in FIG. 1C is the inlet portion upper convolution area 122 and the outlet flange 107. The convolution area extends approximately from the flange to about 25% of the length of the upper inlet side 111. The convolution area extends in width to about 33% of the width of the upper inlet side. A similar convolution area exists on the lower side of the tubular diaphragm and is shown in FIG. 1B.

Figure 1D:
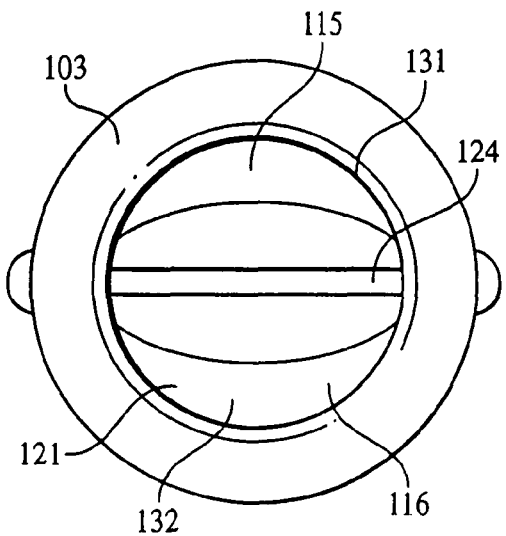
FIG. 1D is an end view of the first embodiment tubular diaphragm in the rest position.

FIG. 1D is an end view of the first embodiment tubular diaphragm in the rest position. Visible in FIG. 1D is the inlet flange 103, the inner surface 131 of the upper side 115 and the inner surface 132 of the lower side 116, and the mechanical closure point 124, where the interior surfaces 131 and 132 of the upper side 115 and lower side 116, respectively, touch when the valve is closed. In the rest position, as shown in FIG. 1D, the inner surfaces of the walls are separated by a distance of less than about one third of the diameter of the tubular diaphragm.

Second Through Fifth Embodiments

The second through fifth embodiments are like the first embodiment in the perspective view, upper view, and end view. Differences in the second through fifth embodiments from each other and from the first embodiment are shown in the side views, FIGS. 2-5.

Second Embodiment

Figure 2:
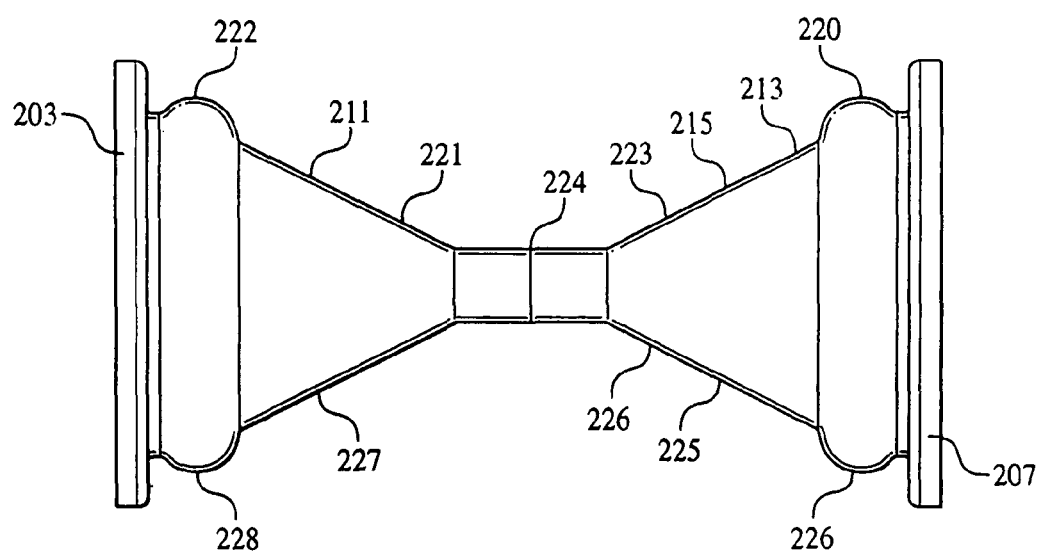
FIG. 2 is a side view of the second embodiment tubular diaphragm in the rest position.

FIG. 2 is a side view of the second embodiment tubular diaphragm in the rest position. Visible in FIG. 2 is the inlet flange 203, outlet flange 207, the upper side 215, and the lower side 216, both of which are divided by the mechanical closure point 224 at approximately the middle of the upper and lower sides into the upper outlet side 213 and upper inlet side 211, and lower outlet side 225 and lower inlet side 227, respectively. The mechanical closure point 224 also divides the entire tubular diaphragm into the inlet portion 221 and outlet portion 223. Also visible in FIG. 2 is the inlet portion upper convolution area 222 and the inlet portion lower convolution area 228.

In the second embodiment as shown in FIG. 2 the inlet portion upper convolution area 222 extends from the inlet flange 203 as a convex bump which then curves downward to the upper inlet side 221 which extends in a straight line to the mechanical closure point 224. The inlet portion lower convolution area 228 extends from the inlet flange 203 as a convex bump and then curves upward to the lower inlet side 227 which extends in a straight line to the mechanical closure point 224.

The outlet portion upper convolution area 220 extends from the outlet flange 207 as a convex bump which then curves downward to the upper outlet side 213 which then curves downward to the mechanical closure point 224. The outlet portion lower convolution area 226 extends from the outlet flange 207 as a convex bump and then curves upward to the lower inlet side 225 which extends in a straight line to the mechanical closure point 224.

Third Embodiment

Figure 3:
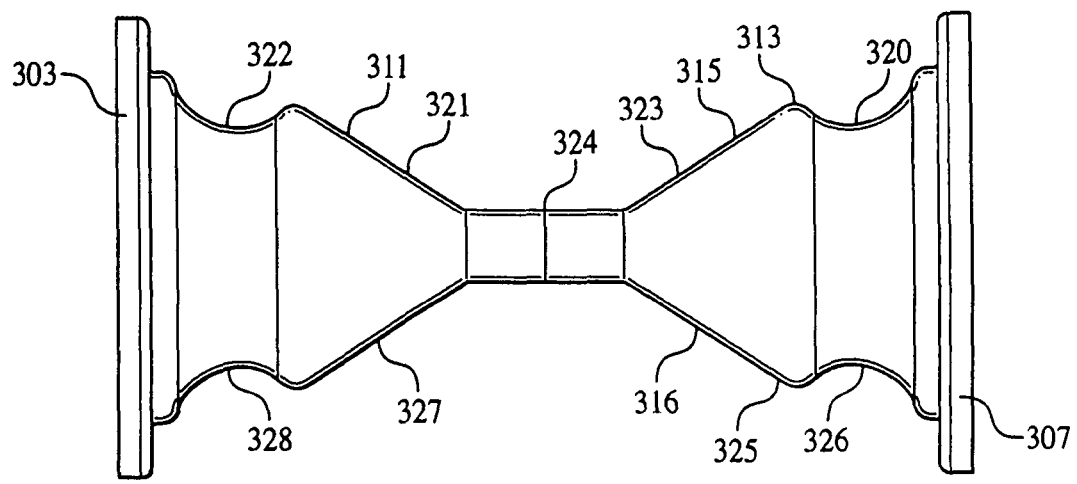
FIG. 3 is a side view of the third embodiment tubular diaphragm in the rest position.

FIG. 3 is a side view of the third embodiment tubular diaphragm in the rest position. Visible in FIG. 3 is the inlet flange 303, outlet flange 307, the upper side 315, and lower side 316, both of which are divided by the mechanical closure point 324 at approximately the middle of the upper and lower sides into the upper outlet side 313 and upper inlet side 311, and lower outlet side 325 and lower inlet side 327, respectively. The mechanical closure point 324 also divides the entire tubular diaphragm into the inlet portion 321 and outlet portion 323. Also visible in FIG. 3 is the inlet portion upper convolution area 322 and the inlet portion lower convolution area 328.

In the third embodiment as shown in FIG. 3 the inlet portion upper convolution area 322 extends from the inlet flange 303 as a concavity and then curves downward to the upper inlet side 321 which extends in a straight line to the mechanical closure point 324. The inlet portion lower convolution area 328 extends from the inlet flange 303 as a concavity and then curves upward to the lower inlet side 327 which extends in a straight line to the mechanical closure point 324.

The outlet portion upper convolution area 320 extends from the outlet flange 307 as a concavity and then curves downward to the upper inlet side 313 which extends in a straight line to the mechanical closure point 324. The outlet portion lower convolution area 326 extends from the outlet flange 307 as a concavity and then curves upward t the lower outlet side 325 which extends in a straight line to the mechanical closure point 324.

Fourth Embodiment

Figure 4:
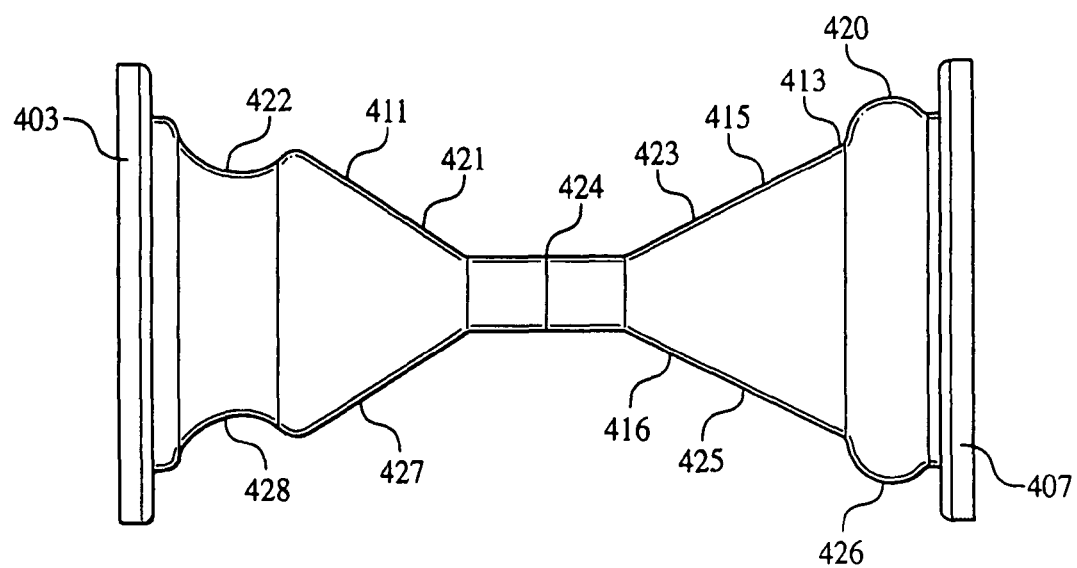
FIG. 4 is a side view of the fourth embodiment tubular diaphragm in the rest position.

FIG. 4 is a side view of the fourth embodiment tubular diaphragm in the rest position. Visible in FIG. 4 is the inlet flange 403, outlet flange 407, the upper side 415, and lower side 416, both of which are divided by the mechanical closure point 424 at approximately the middle of the upper and lower sides into the upper outlet side 413 and upper inlet side 411, and lower outlet side 425 and lower inlet side 427, respectively. The mechanical closure point 424 also divides the entire tubular diaphragm into the inlet portion 421 and outlet portion 423. Also visible in FIG. 4 is the inlet portion upper convolution area 422 and the inlet portion lower convolution area 428. In the fourth embodiment as shown in FIG. 4 the inlet portion upper convolution area 422 extends from the inlet flange 403 as a concavity and then curves downward to the upper inlet side 421 which extends in a straight line to the mechanical closure point 424. The inlet portion lower convolution area 428 extends from the inlet flange 403 as a concavity and then curves upward to the lower inlet side 427 which extends in a straight line to the mechanical closure point 424. The outlet portion upper convolution area 420 extends from the outlet flange 407 as a convex bump which then curves downward to the upper outlet side 413 which extends in a straight line to the mechanical closure point 424. The outlet portion lower convolution area 426 extends from the outlet flange 407 as a convex bump and then curves upward to the lower inlet side 425 which extends in a straight line to the mechanical closure point 424.

Fifth Embodiment

Figure 5:
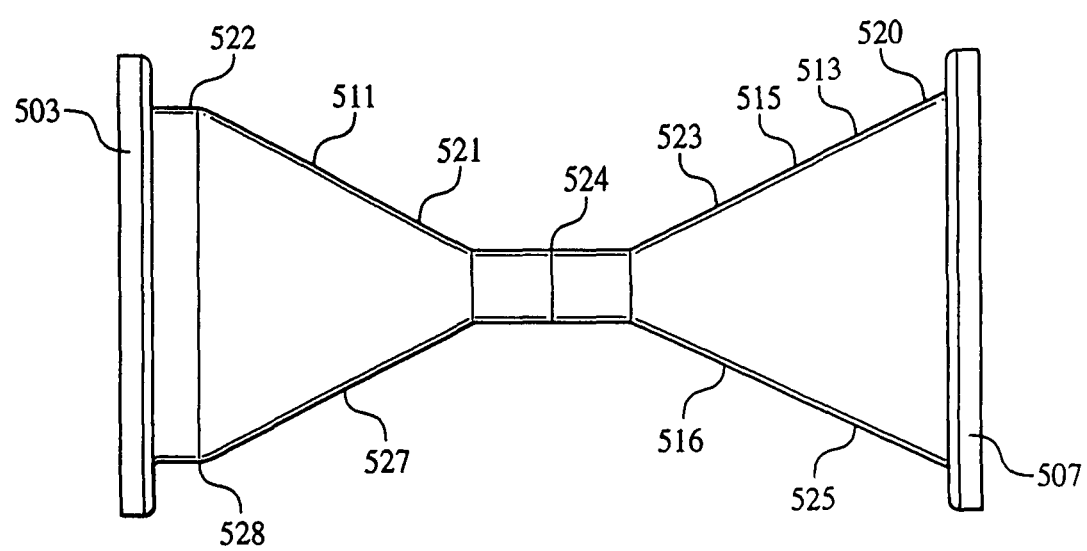
FIG. 5 is a side view of the fifth embodiment tubular diaphragm in the rest position.

FIG. 5 is a side view of the fifth embodiment tubular diaphragm in the rest position. Visible in FIG. 5 is the inlet flange 503, outlet flange 507, the upper side 515, and lower side 516, both of which are divided by the mechanical closure point 524 at approximately the middle of the upper and lower sides into the upper outlet side 513 and upper inlet side 511, and lower outlet side 525 and lower inlet side 527, respectively. The mechanical closure point 524 also divides the entire tubular diaphragm into the inlet portion 521 and outlet portion 523. Also visible in FIG. 5 is the inlet portion upper convolution area 522 and the inlet portion lower convolution area 528.

In the fifth embodiment as shown in FIG. 5 the inlet portion upper convolution area 522 extends from the inlet flange 503 at an approximate right angle and then curves downward to the upper inlet side 521 which extends in a straight line to the mechanical closure point 524. The inlet portion lower convolution area 528 extends from the inlet flange 503 at an approximate right angle and then curves upward to the lower inlet side 527 which extends in a straight line to the mechanical closure point 524.

The outlet portion upper convolution area 520 extends from the outlet flange 507 on a downward straight line which is continued by the upper outlet side 513 to the mechanical closure point 524. The outlet portion lower convolution area 526 extends from the outlet flange 507 on an upward straight line which is continued by the lower outlet side 525 to the mechanical closure point 524.

General

In embodiments, the diameter of the tubular diaphragm ranges from ½ inch to 12 inches. In embodiments, the length of the tubular diaphragm will range from 3 inches to 36 inches.

Embodiment tubular diaphragms are manufactured of any suitable resilient polymeric material. Suitable materials include natural rubber, polypropylene, polyethylene, polyvinylidene fluoride, nitrile rubber, ethylene propylene diene monomer rubber, butyl rubber, vinylidene fluoride monomer fluoroelastomers, silicone rubber, fluorinated ethylene propylene, perfluoroalkoxy, and polytetrafluoroethylene. Nitrile rubber, ethylene propylene diene monomer rubber, and butyl rubber are especially suitable.

Embodiments may be manufactured by any suitable method. Methods of manufacture include injection molding, and extrusion. Compression molding, transfer molding or injection molding are especially suitable methods.

In embodiments, optional tethers are attached on either side of the mechanical closure point. Such tethers interact with and slide into guides which assist the complete opening of the tubular diaphragm.

Although examples in this disclosure include the use of embodiments in the operation of vacuum toilets, it is specifically contemplated that the embodiment tubular diaphragms will find utility in other applications in the movement of fluids when there is a pressure differential between the inlet and outlet of the tubular diaphragms.

Embodiment tubular diaphragms exhibit in particular the advantage of enhanced resistance to failure when compared to conventional diaphragms. This resistance is expressed especially in the outlet portion, which is subject to the maximum pressure differential when the tubular diaphragm is closed, which is the normal condition.

Without wishing to be held to this explanation, the enhanced resistance of embodiments stems from the fact that the premolded mechanical closure point minimizes the flexation of the tubular diaphragm required when it is in the closed position. In particular, since the tubular diaphragm is in the closed position for the vast majority of time it is in use, the premolded mechanical closure point which approximates the closed position minimizes the stress involved in putting the tubular diaphragm in the closed position.

In addition, the convolution areas or the interaction of convolution areas and sides adds to the lifetime of the tubular diaphragms. The convolution areas relieve stresses normally on the tubular diaphragms. The effect of the convolution areas and the shape of the sides enhance the advantages provided by the preformed mechanical closure point.

Advantages from the extended life of embodiments include reduction of the cost of replacement valves, reduction of the labor required to replace worn-out valves, and avoidance of capital costs associated with redundant facilities needed when valves fail.

In embodiments, a tubular diaphragm is normally in the closed position and is opened only when desired. A variety of opening mechanisms can be used. A vacuum mechanism is commonly used, in which the tubular diaphragm is enclosed in a chamber while the atmospheric air pressure and spring pressure maintains the tubular diaphragm in the closed position. The tubular diaphragm is opened when air is evacuated from the chamber. The opening of the tubular diaphragm may be assisted by mechanical means attached to tethers located at the mechanical closure point. Other means of operating the tubular diaphragms are contemplated.

While a number of exemplary aspects and embodiments have been discussed above, those of skill in the art will recognize certain modifications, permutations, additions and sub combinations thereof. It is therefore intended that the following appended claims and claims hereafter introduced are interpreted to include all such modifications, permutations, additions and sub-combinations as are within their true spirit and scope. The applicant or applicants have attempted to disclose all the embodiments of the invention that could be reasonably foreseen. There may be unforeseeable insubstantial modifications that remain as equivalents.

We claim:

1. A tubular diaphragm comprising:
   a tube manufactured of resilient elastomer,
   an inlet flange and an outlet flange at the ends of the tube,
   the tube having an upper and a lower side, each side having an inner surface,
   the tube closed when the inner surface of the upper side is in contact with the inner surface of the lower side,
   a preformed mechanical closure point in which the inner surfaces of the upper and lower sides are separated by a gap of not greater than ⅓ of the diameter of the tube when the tube is not closed,
   the mechanical closure point located at the middle of the length of the tubular diaphragm and dividing it into an inlet and an outlet portion,
   preformed convolution areas on the upper and lower sides of the inlet and outlet portions,
   the convolution areas located adjacent to a flange and extending in length from the flange to about 25% of the length of a side,
   when viewed from the side of the tubular diaphragm, the inlet portion upper convolution area extends from the inlet flange at a right angle and curves downward to the upper inlet side which extends in a straight line to the mechanical closure point, the inlet portion lower convolution area extends from the inlet flange at a right angle and curves upward to the lower inlet side which extends in a straight line to the mechanical closure point,
   when viewed from the side of the tubular diaphragm, the outlet portion upper convolution area extends from the outlet flange in a concave curve to the upper outlet side which extends in a concave curve to the mechanical closure point, the outlet portion lower convolution area extends from the outlet flange upward in a concave curve to the lower outlet side which extends in a concave curve to the mechanical closure point, and
   when viewed from the top of the tubular diaphragm, the mechanical closure point defines a first width, the inlet flange defines a second width, and the outlet flange defines a third width, the first width being greater than the second width and the third width.

2. The tubular diaphragm of claim 1 wherein the material of manufacture is chosen from the group of materials consisting of natural rubber, polypropylene, polyethylene, polyvinylidene fluoride, nitrile rubber, ethylene propylene diene monomer rubber, butyl rubber, vinylidene fluoride monomer fluoroelastomers, silicone rubber, fluorinated ethylene propylene, perfluoroalkoxy, and polytetrafluoroethylene.

3. The tubular diaphragm of claim 1 wherein the material of manufacture is natural rubber, nitrile rubber, ethylene propylene diene monomer rubber or butyl rubber.

4. The tubular diaphragm of claim 1 wherein the pressure on the inside of the inlet portion is greater than the pressure on the inside of the outlet portion.

5. The tubular diaphragm of claim 1 wherein the pressure on the inside of the inlet portion is approximately one atmosphere and the pressure on the inside of the outlet portion is approximately that of a vacuum of up to 29.9 inches mercury.

6. The tubular diaphragm of claim 1 wherein the diameter of the tubular diaphragm is from 0.5 inches to one foot.

7. The tubular diaphragm of claim 1 wherein the diameter of the diaphragm is 2 inches.

8. The tubular diaphragm of claim 1 wherein, when viewed from the top of the tubular diaphragm, the mechanical closure point, the inlet portion, the outlet portion, the inlet flange, and the outlet flange collectively define an octagonal shape.

9. The tubular diaphragm of claim 1 wherein at least one of the inlet portion upper convolution area and the outlet portion upper convolution area defines a convex bump.

10. The tubular diaphragm of claim 1 wherein the inlet portion defines a constant wall thickness extending from the inlet flange to the mechanical closure point.

* * * * *